United States Patent
Hostyn et al.

(10) Patent No.: US 9,866,709 B2
(45) Date of Patent: Jan. 9, 2018

(54) APPARATUS AND METHOD FOR DETERMINING TRENDS IN PICTURE TAKING ACTIVITY

(71) Applicant: Sony Corporation, Minato-ku (JP)

(72) Inventors: Tom Hostyn, Halle (BE); Olivier Demarto, Sint-Gillis (BE); Kenny Helsens, Ghent (BE); Jan Spooren, Schoten (BE); Philip Marivoet, Tienen (BE); Teemu Veikko Tapani Pohjola, Rovaniemi (FI); Magdalena Wasowska, Kessel-Lo (BE); Conor Aylward, Brussels (BE); Gaetan De Brucker, Aalst (BE); Joachim Giard, Hevillers (BE); Chris Minnoy, Holsbeek (BE)

(73) Assignee: SONY CORPORATION, Tokyo (JP)

(*) Notice: Subject to any disclaimer, the term of this patent is extended or adjusted under 35 U.S.C. 154(b) by 69 days.

(21) Appl. No.: 14/562,016

(22) Filed: Dec. 5, 2014

(65) Prior Publication Data
US 2015/0170039 A1    Jun. 18, 2015

(30) Foreign Application Priority Data

Dec. 13, 2013    (EP) .................................... 13197172

(51) Int. Cl.
H04N 1/00    (2006.01)
H04N 1/32    (2006.01)
H04N 101/00    (2006.01)

(52) U.S. Cl.
CPC ..... H04N 1/00204 (2013.01); H04N 1/32128 (2013.01); H04N 2101/00 (2013.01);
(Continued)

(58) Field of Classification Search
CPC .......... H04N 1/00204; H04N 1/32128; H04N 2201/3253; G06F 17/30
(Continued)

(56) References Cited

U.S. PATENT DOCUMENTS 8,144,232 B2    3/2012    Larson et al.
8,433,815 B2    4/2013    Van Coppenolle et al.
(Continued)

FOREIGN PATENT DOCUMENTS

EP    1 971 144 A1    9/2008
KR    10-2012-0014794    2/2012

OTHER PUBLICATIONS

"Wikitude—app of the week", http://www.skyscanner.net/news/wikitude-app-week, Mar. 14, 2013, 2 pages.
(Continued)

*Primary Examiner* — Nhan T Tran
(74) *Attorney, Agent, or Firm* — Oblon, McClelland, Maier & Neustadt, L.L.P.

(57) ABSTRACT

It is described an apparatus for determining trends in picture taking activity. The apparatus comprises a meta information accessing unit for accessing a set of meta information, each meta information in the set of meta information being associated with a picture having been taken with a camera device at a respective geographic location and at a respective time. The apparatus further comprises a processing unit for determining trends in picture taking activity based on the set of meta information accessible by the meta information accessing unit.

25 Claims, 13 Drawing Sheets

(52) U.S. Cl.
CPC ............... *H04N 2201/0084* (2013.01); *H04N 2201/3253* (2013.01)

(58) Field of Classification Search
USPC ........................................... 348/207.1, 211.1
See application file for complete search history.

(56) References Cited

U.S. PATENT DOCUMENTS

| | | | |
|---|---|---|---|
| 2005/0078174 A1 | 4/2005 | Casey et al. | |
| 2008/0320078 A1* | 12/2008 | Feldman | G06F 17/30867 709/203 |
| 2009/0162042 A1* | 6/2009 | Wexler | H04N 5/23222 396/49 |
| 2009/0324022 A1 | 12/2009 | Sangberg et al. | |
| 2010/0292917 A1 | 11/2010 | Emam et al. | |
| 2011/0064281 A1 | 3/2011 | Chan | |
| 2011/0184953 A1 | 7/2011 | Joshi et al. | |
| 2011/0206284 A1 | 8/2011 | Das et al. | |
| 2012/0110031 A1* | 5/2012 | Lahcanski | H04N 1/00244 707/812 |
| 2012/0129554 A1 | 5/2012 | Friedmann | |
| 2012/0321143 A1 | 12/2012 | Krupka et al. | |
| 2012/0331168 A1 | 12/2012 | Chen | |
| 2013/0058626 A1 | 3/2013 | Avina et al. | |
| 2014/0059139 A1* | 2/2014 | Filev | G06Q 50/01 709/205 |
| 2015/0288869 A1* | 10/2015 | Furuhashi | H04N 5/23206 348/207.11 |

OTHER PUBLICATIONS

Ben Parr, "Augmented Wikipedia Reality Has Arrived on the iPhone", http://www.mashable.com/2009/10/02/wikitude , Mar. 14, 2013, 3 pages.
"How to use the Wikitude App", http://www/wikitude.com/app/how-to-use-wikitude , Mar. 14, 2013, 4 pages.
"Augmented Reality & Tourism: Unleash the whole potential!", http://www.myariadne.com/features/augmented-reality , Mar. 14, 2013, 6 pages.
"AR in Tourism and Travel", ENDIGY—Research and Development Center Prague, http://endigy.com/2.5_AR_tourism_travel.php , Mar. 14, 2013, 1 page.
Sirat Datoo, "Graph Search—coming to a Facebook near you", http://www.theguardian.com/technology/blog/2013/jul/08/facebook-launch-graph-search-privacy-concerns , 6 pages.
Jesse Stay, "Want Facial Recognition With google Glass? Use Google+", http://www.staynaline/com/2013/05/want-facial-recognition-with-google.html , 5 pages.

* cited by examiner

APPARATUS AND METHOD FOR DETERMINING TRENDS IN PICTURE TAKING ACTIVITY

The invention relates to apparatus, systems and methods for determining trends in picture taking activity and to apparatus, systems and methods which provide a cloud-based photo guide. The disclosed apparatus, systems and methods may for example allow enriching camera devices with location based real-time feedback on picture taking activity.

BACKGROUND

With the increasing popularity of cloud services in the past years, Internet-based photo and video storing services have become widely used by private and professional photographers throughout the world. Photo and video storing services provide the users with data storage capacity for storing photo and video collections comprising thousands of photos and videos taken over years with point-and-shoot cameras, digital single-lens reflex (DSLR) cameras, mobile phone cameras, video cameras, etc. Such photo and video storing services typically provide the user with the capability of sharing photos and videos with family and friends and presenting photos and videos to the public.

Cameras, in particular those integrated within mobile phones, may be connected to communication systems and thus allow the user to upload pictures to photo and video storing services immediately after capture. Today even point-and-shoot cameras, DSLR cameras, and video cameras may be provided with WI-FI and/or UMTS or LTE transceivers which allow the user to connect with the Internet to upload and share photos and videos.

Today, cameras may comprise GPS sensors which allow photos and videos to be tagged with geographic coordinates which mathematically represent the location at which a photo or video was taken.

In the light of this, an object of the invention is to provide camera users with new or improved services.

SUMMARY

Apparatus, systems and methods for determining trends in picture taking activity, and apparatus, systems and methods which provide a cloud-based photo guide are disclosed and defined in the appended set of claims.

BRIEF DESCRIPTION OF THE DRAWINGS

Details of the disclosed apparatus, systems and methods will become more apparent from the following description of embodiments in connection with the accompanying drawings, of which

DETAILED DESCRIPTION OF THE EMBODIMENTS

Figure 1:
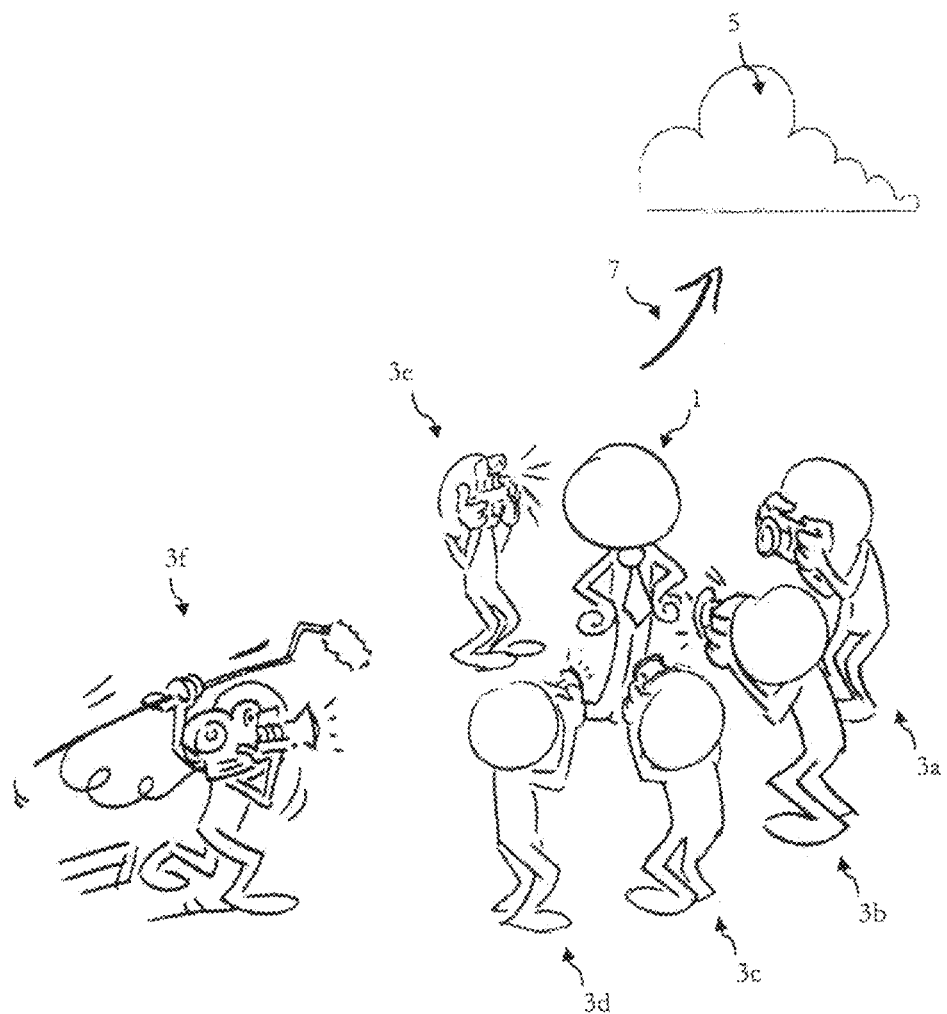
FIG. 1 illustrates an event happening at a specific geographic location which leads to a local and temporal increase in picture taking activity.

Aspects of embodiments of an apparatus for determining trends in picture taking activity are now described.

Picture taking happens whenever a user of a camera device captures a picture at a specific geographical location and at a specific time. The term picture as used here may for example refer to single photos, or to video data. In the case of a photo, the specific geographic location and the specific time attributed to the capturing of the photo reflects the geographical location and the time at which a camera's shutter release button was pressed. In the case of a video, a specific geographical location may be attributed to the video by defining the geographical location and time at which video capture was started as the specific geographical location and the specific time of the video capture. Alternatively, a specific geographical location and a specific time of a video capture may be obtained by computing midpoint, arithmetic mean, or median of geographical location and time of video capture. The act of taking a photo or video as described above is in the following also named as picture taking. A camera device may be anything that is able to take pictures, such as point-and-shoot camera, a DSLR camera, a cell phone, a smart phone, a tablet computer, etc.

When many users of many camera devices capture pictures, such as photos and videos, anytime and all over the Earth, a multitude of pictures are produced. Picture taking activity reflects the picture taking of many users of camera devices. Measures of picture taking activity may for example be obtained by a statistical analysis of a set of picture taking incidents.

Trends in picture taking activity may be an indication for a (significant) event happening at specific geographic locations and during specific periods of time. A trend may for example reflect a (significant) increase in picture taking activity at a geographical location and at a specific time. In the context of specifying trends in picture taking activity, the term geographical location may relate to a singular geographical point on the Earth, e.g. represented by coordinates, and to a single point in time, but may likewise relate to defined geographical regions in which and time periods during which a trend is observed.

An apparatus for determining trends in picture taking activity according to an embodiment may comprise a meta information accessing unit configured to access a set of meta information. The set of meta information accessed by the apparatus may comprise individual meta information, each meta information being associated with a picture having been taken with a camera device at a respective geographic location and at a respective time.

Meta information associated with a picture typically comprises information related to the picture, such as at least one of time of the picture capture, geographic location of the picture capture, or other information like camera model used for capturing, camera parameters used when capturing a picture, a description of the captured object added by the camera user or by the camera device, tags added to pictures which describe the object or scenario on the picture, mood information obtained for example from using smile detection techniques, and so on. Meta information may be stored in the data file which stores the picture data as such. The IPTC format is an example for a standardized way of storing meta information within a jpg file. Meta data may also be stored external to the actual picture data in a dedicated database. A meta data accessing unit is arranged to read such meta information, e.g. by accessing a database which stores the meta information, or by reading meta information from picture files. A meta information accessing unit may for example be implemented as a database client module.

An apparatus for determining trends in picture taking activity according to an embodiment may further comprise a processing device configured to determine trends in picture taking activity based on the set of meta information accessible by the meta information accessing unit. The processing device may be a single processor, a central processor of a standard server computer, or a specified processor for large scale data mining. In embodiments where large amounts of meta information corresponding to pictures taken all over the world are processed, parallel processing can be applied in which the processing task is distributed over a large amount of processors. In this case the processing device is made up of multiple, e.g. up to hundreds, thousands or even more single processors. These processors may be located in a single server entity, in a computer cluster, or even distributed at multiple locations all over the world. Communication between the individual processors which make up the processing device may be established over communication networks such as the Internet or local area networks. It is, here, of no importance, how many processors are employed in the processing device, or where these processors are located. An apparatus according to the embodiments may be considered as what is commonly referred to as being located "in the cloud".

An apparatus for determining trends in picture taking activity may further comprise a picture storage for storing a set of pictures, each picture having been taken with a camera device at a respective geographic location. As it was described above in the context of the processing device, the picture storage may be a single storage device operating on a single hardware entity, or, if large amounts of pictures are involved, a storage which is distributed over multiple hardware entities which are not necessarily located in the same housing, the same building, or even in the same country. The picture storage according to an embodiment may for example comprise physical storage devices such as hard disks and software responsible for organizing and storing the pictures on these storage devices. The picture storage may be accessible over data communication networks so that users all over the world are enabled to upload to the picture storage pictures taken with camera devices. Such an exemplifying picture storage may be considered as a cloud storage for pictures, e.g. photos and videos, and may be part of a cloud service offered to a large amount of camera device users.

An apparatus for determining trends in picture taking activity according to an embodiment may further comprise a meta information database configured to store a set of meta information, each meta information being associated with a picture of the set of pictures. Concerning the aspects of physical storage, location and number of physical storage devices employed, the same principles as described above in the context of the picture storage may apply, i.e. the meta information database may be a centralized, or, alternatively, a distributed unit, depending on the needs and the amount of meta information to be handled by the database. The database is typically implemented as database software which stores data organized in distributed tables or similar structures on one or more physical storage media. The meta information database may store meta information whenever a picture is uploaded to the picture storage described above. In an exemplifying embodiment, the meta information database stores meta information for each picture contained in the picture data base.

The meta information database and the picture files may be stored on the same physical data storage device, on different physical data storages or may be distributed over several physical data storage devices. In a preferred embodiment the meta information is kept in specific database tables, the picture files are stored in a distributed storage (e.g. a cloud storage), and the database tables comprise, in addition to the meta information, links to the physical location of the associated picture files. This may allow fast computations to be performed on the set of meta information stored in the meta information database.

According to an embodiment of an apparatus for determining trends in picture taking activity, the meta information may comprise location information and temporal information. The location information may describe the geographic location at which an associated picture was taken. This geographic location may for example be expressed as a pair of numbers, longitude and latitude. The temporal information may describe the time at which an associated picture was taken or uploaded to the picture storage. The time may be expressed, for example, in the form dd.mm.yyyy (day, month, year), hh:ss (hour and seconds), or may be expressed in other form, e.g. in the number of (mili)seconds, and/or days, and/or years which have been passed with regard to a reference time. The temporal information may be established using time stamps produced by a camera in a picture file at the instance of the image capture, for example in the EXIF meta information included in a picture file. Alternatively or in addition, the processing device may monitor the points in time at which a pictures are uploaded to the picture storage and use the upload times to establish temporal information. The upload time of a picture may be particularly helpful in cases where no time stamp is available in the meta information of an uploaded picture file. As stated earlier, in the case of a photo, the specific geographic location and the specific time attributed to the capturing of the photo reflects the geographic location and, respectively, the time at which a camera's shutter release button was pressed. However, in the case of a video, a specific geographical location may be attributed to the video by defining the geographical location and time at which video capture was started as the specific geographical location and the specific time of the video capture. Alternatively, a specific geographical location and a specific time of a video capture may be obtained by computing midpoint, arithmetic mean, or median of geographical location and time of video capture.

According to embodiments, the processing device may comprise a location base analysis unit configured to determine local picture taking activity based on the set of meta information stored in the meta information database. An exemplifying location base analysis unit performs analysis of the set of meta information in the location domain. To achieve this, the location base unit may be arranged to organize the totality of pictures managed in a meta information database in smaller collections according to their local distribution. This may for example allow to identify locations and/or areas in which the picture taking activity is high or increasing and other locations and/or areas in which the picture taking activity is low or decreasing. Local picture taking activity relates to the picture taking activity at a specific location or in a specific region. The local picture taking activity may relate to rather small distance scales such as to the street level, as well as to larger distance scales, such as the city level. For instance, while being in a city, the local activity might relate to an area of 2 square kilometers, capable of steering the user to nearby events. In other situations, for instance when a user arrives at the airport of a country's capital, the local picture taking activity may refer to larger areas at a city scale (e.g. 2500 square kilometers), capable of steering the user to the most active city in the country at the time.

According to further embodiments, the processing device may comprise a time base analysis unit configured to determine temporal picture taking activity based on the meta information stored in the meta information database. An exemplifying time base analysis unit performs analysis of the set of meta information in the time domain. To achieve this, the time base unit may be arranged to organize the totality of pictures managed in a picture or meta information database in smaller collections according to their attributed time information. This may for example allow to identify temporal changes in picture taking activity.

Combining computations performed by the location base analysis unit with computations performed by the location base analysis unit allows to determine local trends in picture taking activity, for example an increase in picture taking activity within a specific region or at a specific place within a defined period of time or at a specific point in time.

The location base analysis unit and the time base analysis unit may be implemented within a single analysis unit which is arranged to determine local picture taking activity and/or temporal picture taking activity based on the meta information stored in the meta information database. Such determinations may happen in parallel, in subsequent steps, or in combined calculations which determine local picture taking activity and temporal picture taking activity at the same time.

According to a further embodiment, the processing device may comprise a trend detection unit configured to determine trends in picture taking activity based on local picture taking activity obtained by the location base analysis unit and/or based on temporal picture taking activity obtained by the time base analysis unit.

The trend detection unit may for example be configured to determine trends in picture taking activity based on pictures uploaded to the apparatus for determining trends in picture taking from a plurality of camera devices in real-time, and in which a determined trend corresponds to a current event taking place at a specific location which causes the number of uploaded pictures to be higher than a historical mean.

A trend may for example reflect a significant increase or decrease in picture taking activity at a geographic location or within a geographic region and/or at a specific point in time or during a specific timespan. Such a trend may for example reflect an event happening at a specific geographic location. If, for example, a famous movie star exposes himself to the public, many camera users will take photos and videos of the movie star and upload, as described above, the taken photos and videos to the picture storage database for sharing the pictures with friends and family. Such an event may result in a significant increase of picture taking activity at the corresponding location and during the corresponding timespan which the event lasts. Such a local increase in picture taking activity may be observed as a trend determined by the trend detection unit.

The significance of an increase or decrease may for example be determined by statistical means which allow to distinguish an increase or decrease which merely reflects expectable statistical fluctuations in the counted picture uploads (in the absence of anything special going on at the specific location or in the region) from an increase/decrease in the counted picture uploads which allows with some confidence to conclude that the increase/decrease is caused by some peculiar event happening at the specific location or in the specific region.

The location base analysis unit, the time base analysis unit and also the trend detection unit may be implemented within a single analysis unit which is arranged to determine local picture taking activity and/or temporal picture taking activity and/or trends in picture taking activity based on the meta information stored in the meta information database. As already stated above, such determinations may happen in parallel, in subsequent steps, or in combined calculations which determine local picture taking activity, temporal picture taking activity and trends at the same time.

According to a still further embodiment, the processing device may comprise a camera parameter reception unit configured to receive camera parameters of a camera device and a recommendation providing unit configured to provide recommendations to the camera device. Camera parameters may for example be location parameters, or, optionally parameters reflecting the physical orientation of a camera device.

The recommendation providing unit may provide recommendations to camera devices based on the received camera parameters and based on detected trends in picture taking activity. According to an exemplifying embodiment, the recommendation providing unit is arranged to inform users of the camera device about trends which currently happen in their vicinity. Such trends may for example result from a specific event happening in the vicinity of the user, for example the exposure of a famous movie star to the public in the vicinity of the user of the camera device. The vicinity of a user may for example be determined by defining a maximum distance from the user's geographic location within which a detected trend in local image taking activity is considered to be of relevance to the user. This maximum distance may be predetermined by the system operator, or may be set by the camera user in the camera device and communicated to the processing device. For example, the user may set a maximum distance of 1 kilometer in the configuration settings of the camera device. The processing device will then recommend trends to the camera user which concern a 1 kilometer range around the user's present location. A detected trend may be recommended to the camera user, for example by a sending a corresponding textual or pictorial notification message to the user and displaying this notification message on the camera device. Alternatively or in addition, pictures taken by other camera users which contribute to the detected trend may be displayed to the user as part of the notification message. This may provide the user with a representation of the event which produced the trend in picture taking activity detected by the trend detection unit. After having received a recommendation, the user may decide, based on the recommendation, whether or not he is interested in seeing what is happening at the indicated location and whether or not he wants to join the event. Further, alternatively or in addition the user of a camera device may be notified by speech messages or sound alerts about trends in picture taking activity detected in the vicinity of the user. This may be helpful in alerting a camera user about trends during times in which the user is not actively looking at the camera display and thus not in the position of recognizing textual or pictorial recommendations.

An apparatus for determining trends in picture taking activity as described in the embodiments above may provide a cloud service to users of camera devices. An embodiment of a cloud service may provide recommendations to users of camera devices based on determined trends in picture taking activity. According to embodiments where pictures are uploaded in real-time and users of camera devices are informed about significant trends in picture taking activity immediately when such trends have been observed, the cloud service may be considered as being capable of providing a real-time trend detection and recommendation service. Further, a cloud service may provide a storage service to users of camera devices, the storage service allowing users of camera devices to store pictures in a picture storage. This picture storage may be located in the apparatus for determining trends in picture taking activity, or this picture storage may be located external to the apparatus for determining trends in picture taking activity. A cloud service that automatically receives uploaded pictures may receive many uploads of pictures with the position where these pictures were taken. This allows doing trend detection of this information, to find out where interesting photo taking opportunities might be.

Embodiments of camera devices are now described.

A camera device may comprise a recommendation reception unit configured to receive recommendations from an apparatus for determining trends in picture taking activity, the recommendations being based on trends in picture taking activity detected by the apparatus for determining trends in picture taking activity.

A camera device may further comprise a recommendation notification unit configured to notify recommendations received from the apparatus for determining trends in picture taking activity. The camera device may further comprise a display, for example a LCD or OLED screen. The recommendation notification unit may be configured to display text or picture notifications on such as display of the camera device. In addition or alternatively, the recommendation notification unit may use a loud speaker of the camera device for playing sound alerts or speech notifications to the user.

The recommendations received by the recommendation reception unit may be determined based on pictures and associated meta information uploaded to the apparatus for determining trends in picture taking activity by other camera devices in the vicinity of the camera device.

A camera device may have a picture sensor configured to capture pictures. The picture sensor may for example be a CCD or CMOS sensor, as it is commonly used in point-and-shoot cameras, DSLR cameras, mobile phone cameras, or video cameras. The camera device further comprises a picture taking unit configured to capture pictures sensed by the picture sensor. This picture taking unit may for example be a camera application on a mobile phone or any other software for producing picture files from the data provided by the picture sensor. The camera device may also comprise a meta information determination unit configured to determine meta information, each meta information being associated with a picture having been taken with the picture sensor at a respective geographic location and at a respective time. The meta information determination unit may for example comprise a GPS receiver, a GLONASS receiver, or Galileo receiver, or cellular network cell ID determination means, or any other location provider for obtaining the geographic location of a camera device at time of picture capture. The meta information determination unit may further comprise a clock for determining the time of picture capture.

The camera device may further comprise a data communication interface configured to connect the camera device to a telecommunication network such as the Internet. This communication interface may for example be a WI-FI or a UMTS/LTE transceiver. The recommendation reception unit may for example receive the recommendations via such a data communication interface in the form of data files containing text and/or pictures.

The camera device may further comprise an uploading unit for uploading pictures taken with the picture sensor and associated meta information determined by the meta information determination unit to an apparatus for determining trends in picture taking activity. The uploading unit may comprise a user interface which allows the user to manually upload pictures, or may allow the user to activate automatic picture uploading. Automatic picture uploading will automatically upload each picture taken with the camera device to the apparatus for determining trends in picture taking activity. This relieves the user from the burden of transferring pictures to a computer, using a cable or portable media (such as a memory stick, sd card, or any other digital storage media).

The uploading unit may be configured to upload pictures to the apparatus for determining trends in picture taking activity in real-time.

The recommendation notification unit may be configured to display to a user of the camera device a textual notification relating to an interesting event, a notification in form of an arrow which indicates a direction where an interesting event is going on, or an indication of a distance of an interesting event.

The uploading unit, the recommendation reception unit and the recommendation notification unit may be implemented as software, either integrated within the camera devices' firmware, or as a software application, or as a downloadable app. The uploading unit, the recommendation reception unit and the recommendation notification unit may be implemented as a single software application or as separate pieces of software in communication with each other.

Embodiments of a system comprising an apparatus for determining trends in picture taking activity may comprise one or more camera devices as described above.

Embodiments of methods of determining trends in picture taking activity are now described.

An exemplary method for determining trends in picture taking activity may comprise accessing a set of meta information, each meta information in the set of meta information being associated with a picture having been taken with a camera device at a respective geographic location and at a respective time. An exemplary method for determining trends in picture taking activity may further comprise determining trends in picture taking activity based on the set of meta information accessible by the meta information accessing unit. An exemplary method may further comprise storing a set of pictures, each picture having been taken with a camera device at a respective geographic location. An exemplary method may further comprise storing a set of meta information, each meta information being associated with a picture of the set of pictures, the meta information comprising location information and time information, the location information describing the geographic location at which an associated picture was taken and the temporal information describing the time at which an associated picture was taken. In an exemplary method for determining trends in picture taking activity, the determining trends in picture taking activity comprises determining local picture taking activity based on the meta information stored in the meta information database. The determining trends in picture taking activity may further comprise determining temporal picture taking activity based on the set of meta information stored in the meta information database. The determining trends in picture taking activity may further comprise determining trends in picture taking activity based on local picture taking activity and/or temporal picture taking activity. In some embodiments, determining local picture taking activity comprises performing a real-time collection and processing of geographically-tagged pictures into fixed rasters of a world map. In other embody) invents, determining temporal picture taking activity comprises regarding a recently taken picture to be more important than older pictures. An exemplary method for determining trends in picture taking activity may further comprise providing recommendations to camera devices based on detected trends in picture taking activity.

Embodiments of a further apparatus for determining recommendations to a user of a camera device are now described.

A further apparatus for determining recommendations to a user of a camera device may comprise a camera parameter reception unit configured to receive camera parameters from the camera device. The apparatus may further comprise a processing unit configured to determine recommendations based on camera parameters and based on information derived from uploads by many different users which have taken photos in the past.

A cloud service comprising such an apparatus for determining recommendations to a user of a camera device may provide recommendations to users of camera devices based on camera parameters and based on information derived from uploads by many different users which have taken photos in the past. Such a cloud service may be called a cloud-based photo guide.

Embodiments of an apparatus for determining trends in picture taking activity, embodiments of corresponding systems, embodiments of corresponding methods, and embodiments of a cloud-based photo guide are now described with reference to the appended drawings.

Picture Taking Activity

FIG. 1 illustrates an event happening at a specific geographic location which leads to a local and temporal increase in picture taking activity. A famous film star 1 appears in the public. Users 3a-d with point-and-shoot cameras, a user 3e with a DSLR camera with shoe-mounted flash, and a user 3f with a professional film camera are capturing photos and videos of the film star 1. The photos and videos taken are immediately uploaded to cloud services 5. This uploading process is indicated by arrow 7.

Figure 2:
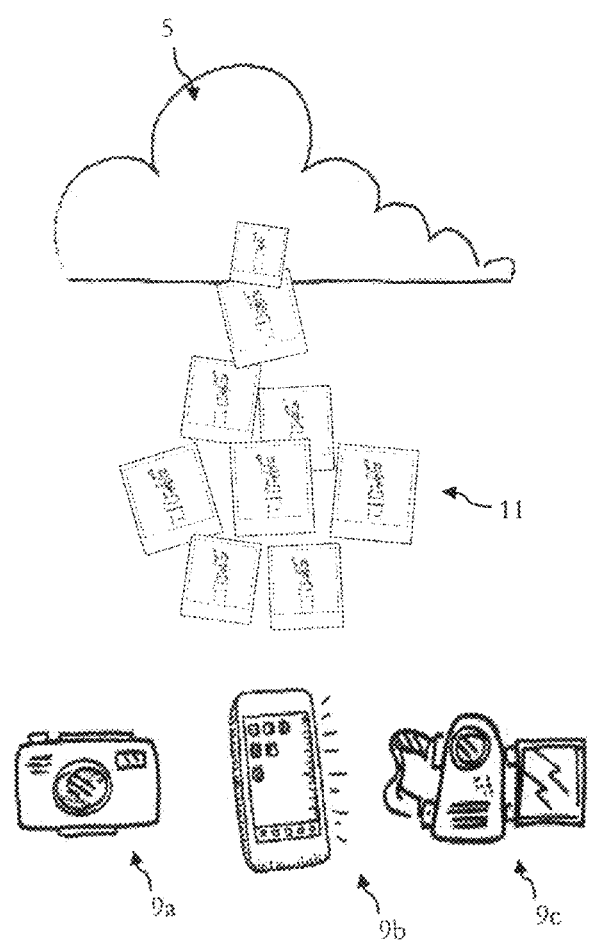
FIG. 2 illustrates the uploading of pictures from camera devices to cloud services which may happen any time and all over the world.

FIG. 2 illustrates the uploading of pictures from camera devices to cloud services, which may happen any time and all over the world. Exemplary camera devices which shall represent the totality of camera devices used by millions all over the world are a point-and-shoot camera 9a, a mobile phone 9b with built-in camera, and a video camera 9c. A flood of pictures 11 taken by these camera devices is uploaded to cloud services 5.

System for Determining Trends in Picture Taking Activity

Figure 3:
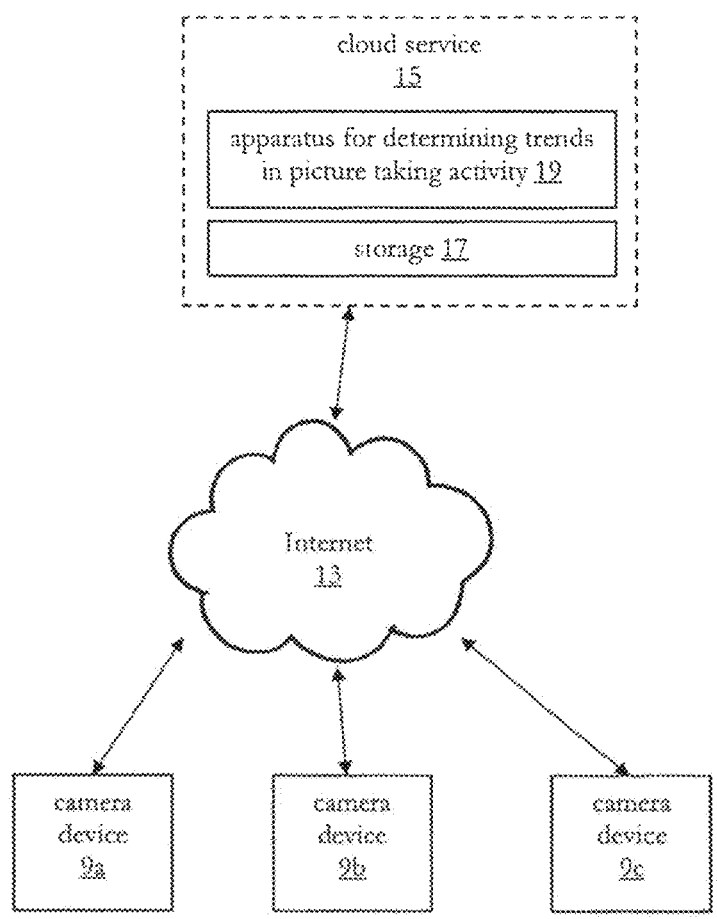
FIG. 3 schematically shows an embodiment of a system comprising multiple camera devices and an apparatus for determining trends in picture taking activity.

FIG. 3 schematically depicts an embodiment of a system comprising multiple camera devices and an apparatus for determining trends in picture taking activity. Three exemplary camera devices 9a, 9b, 9c are connected over the Internet 13 to a cloud service 15. Cloud service 15 comprises a storage 17 configured to store pictures and meta information. Cloud service 15 further comprises an apparatus for determining trends in picture taking activity 19.

Camera Device

Figure 4:
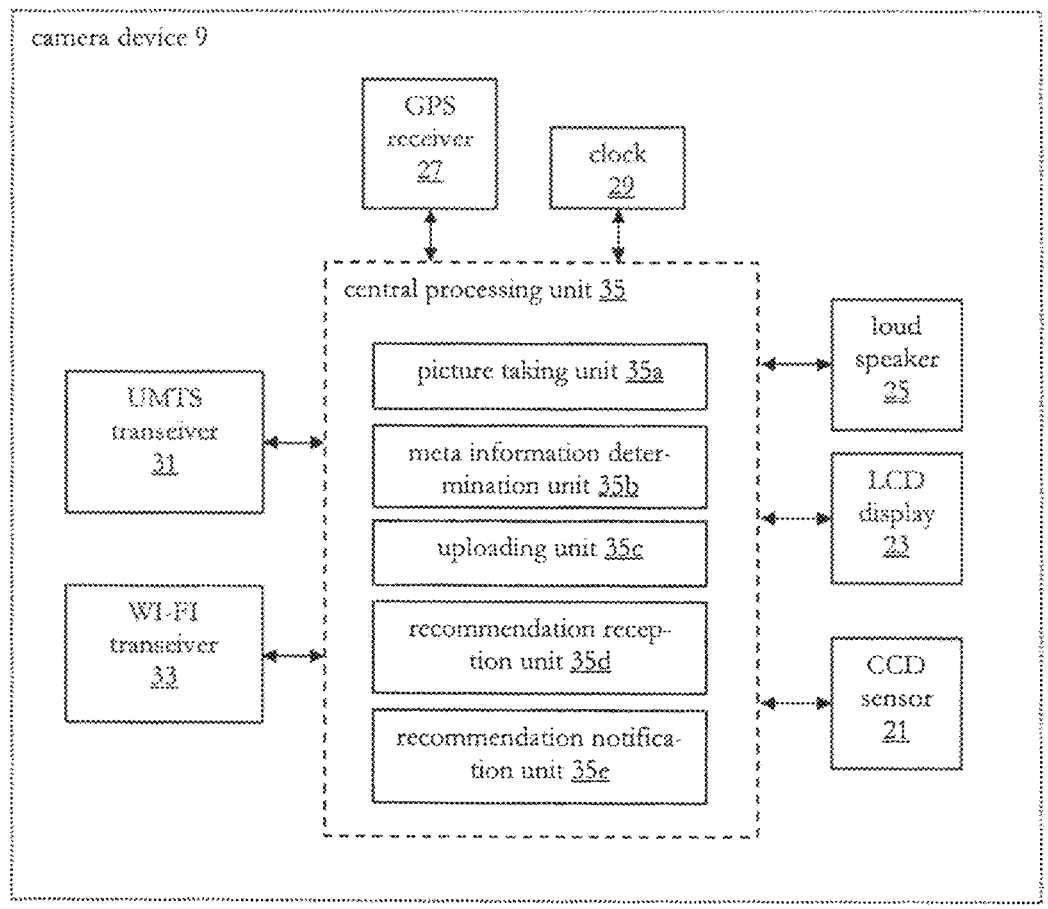
FIG. 4 schematically shows an embodiment of a camera device capable of uploading pictures to a cloud service and receiving recommendations provided by an apparatus for determining trends in picture taking activity.

FIG. 4 schematically shows an embodiment of a camera device capable of uploading pictures to a cloud service and receiving recommendations provided by an apparatus for determining trends in picture taking activity. The camera device comprises a CCD sensor 21 for capturing pictures, a LCD display 23, a loud speaker 25, a GPS receiver 27, a clock 29, an UMTS transceiver 31 and a WI-FI transceiver 33. The camera device further comprises, as a processing device, a central processing unit 35 which is running software. This software implements a picture taking unit 35a in communication with the CCD sensor 21 for capturing pictures from the data sensed by the CCD sensor 21. The software further implements a meta information determination unit 35b in communication with the GPS receiver 27 and the clock 29 for determining the geographic location and time of picture capture, and for associating this information with the taken picture as meta information. The software further implements an uploading unit 35c in communication with the UMTS transceiver 31 and the WI-FI transceiver 33 for uploading pictures taken with the picture sensor 21 and associated meta information determined by the meta information determination unit to a cloud service. The uploading unit 35c may also upload camera parameters such as geographic position obtained by GPS receiver 27 to a cloud service. The software further implements a recommendation reception unit 35d in communication with the UMTS transceiver 31 and the WI-FI transceiver 33 for receiving recommendations from a cloud service. The software further implements a recommendation notification unit 35e in communication with the LCD display 23 and the loud speaker 25 for notifying recommendations to a user of the camera device.

Cloud Service

Figure 5:
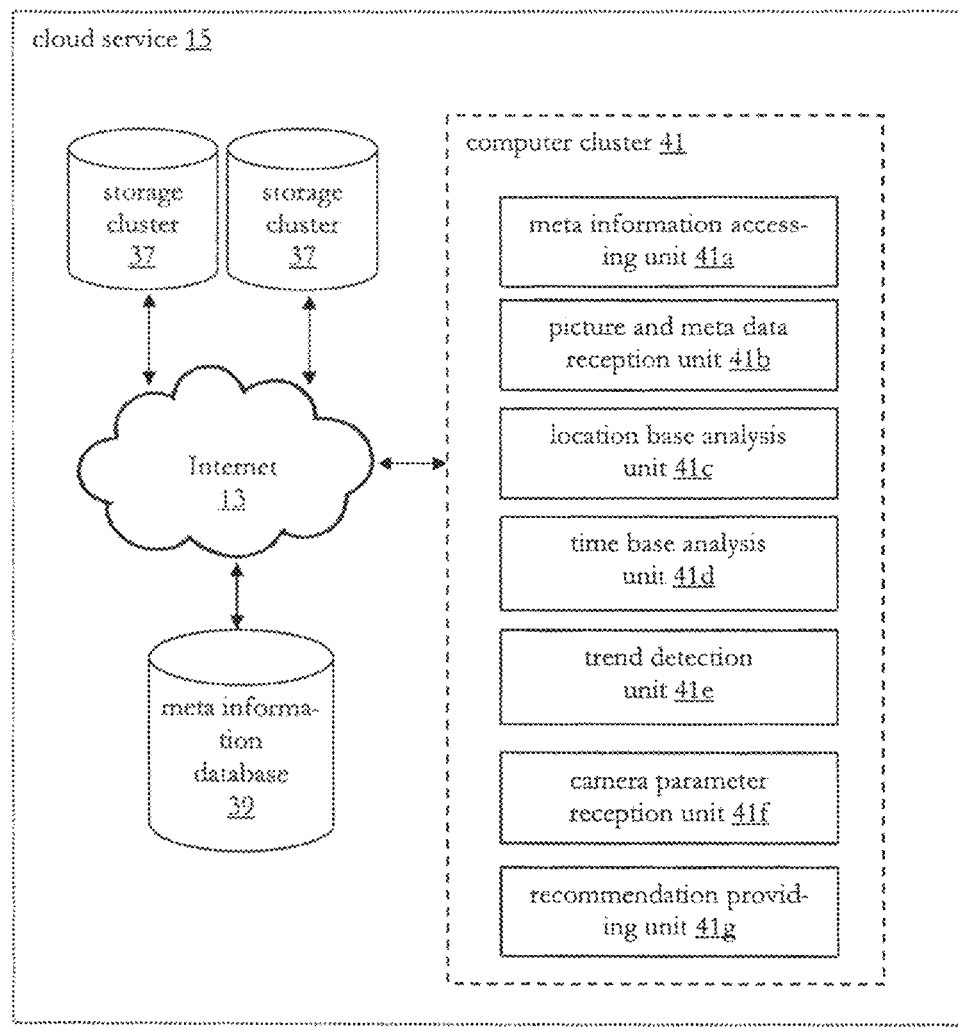
FIG. 5 schematically shows an embodiment of a cloud service comprising an apparatus for determining trends in picture taking activity.

FIG. 5 schematically shows an embodiment of a cloud service 15 which comprises an apparatus for determining trends in picture taking activity. The cloud service 15 comprises, as picture storage, a storage cluster 37 for storing pictures which have been uploaded to the cloud service by users of camera devices. The cloud service 15 further comprises a meta information database 39 for storing meta information associated with pictures stored in the storage cluster 37. The cloud service 15 further comprises, as processing device, a computer cluster 41. The storage cluster 37, the meta information database 39 and the computer cluster 41 are connected to each other via the Internet 13 or a local area network. The computer cluster is running software. The software implements a meta information accessing unit 41a in communication with the meta information database 39 for accessing data stored in the meta information database 39. The software further implements a picture and meta data reception unit 41b in communication with the Internet 13 which allows to receive pictures and associated meta information from camera devices distributed all over the world. The software further implements a location base analysis unit 41c for determining local picture taking activity based on the meta information stored in the meta information database 39. The software further implements a time base analysis unit 41d for determining temporal picture taking activity based on the set of meta information stored in the meta information database 39 and received by the meta information accessing unit 41a. The software further implements a trend detection unit 41e for determining trends in picture taking activity based on local picture taking activity obtained by the location base analysis unit 41c and/or temporal picture taking activity obtained by the time base analysis unit 41d. The software further implements a camera parameter reception unit 41f in communication with the Internet 13 which is arranged to receive, as camera parameters, camera location information and optionally an orientation of the camera device. The software further implements a recommendation providing unit 41g in communication with the Internet 13 which provides recommendations to camera devices based on received camera parameters and based on trends in picture taking activity detected by the trend detection unit 41e.

Methods of Determining Trends in Picture Taking Activity

Figure 6:
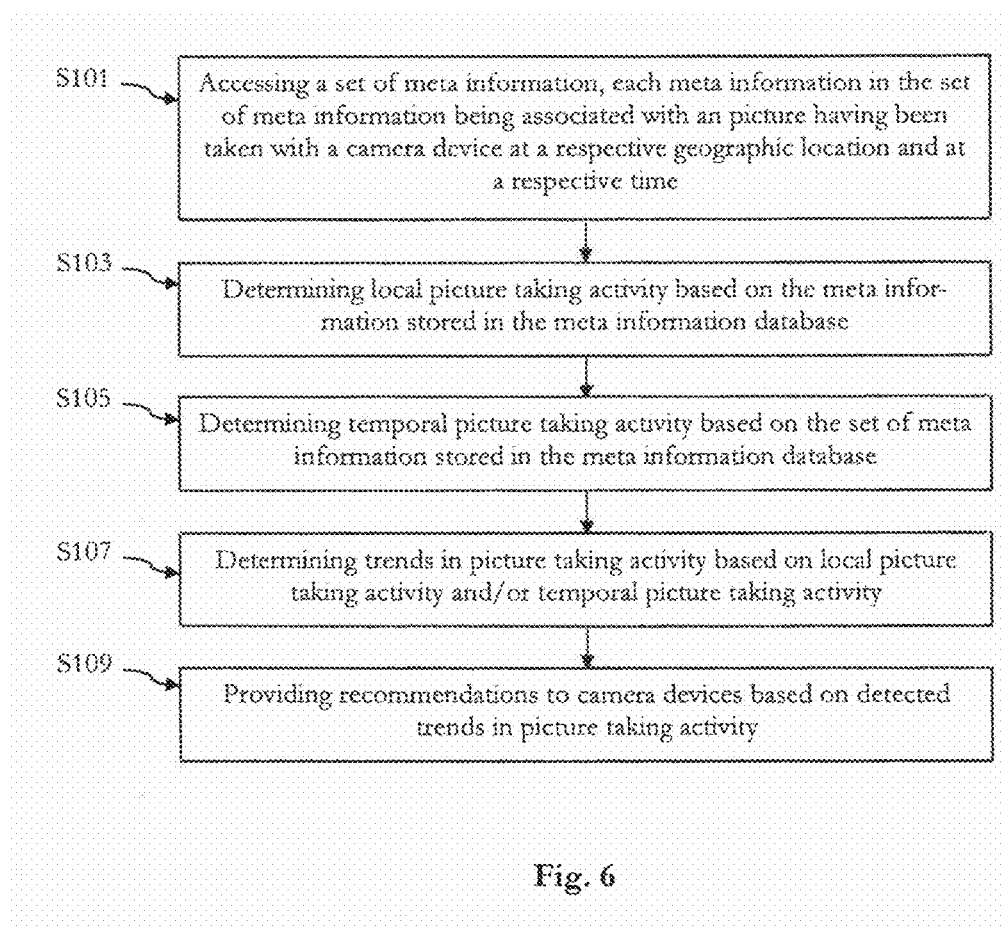
FIG. 6 schematically presents a method of determining trends in picture taking activity.

FIG. 6 schematically presents a method of determining trends in picture taking activity. At S101, a set of meta information is accessed, each meta information in the set of meta information being associated with a picture having been taken with a camera device at a respective geographic location and at a respective time. At S103, local picture taking activity is determined based on the meta information stored in the meta information database. At S105, temporal picture taking activity is determined based on the set of meta information stored in the meta information database. At S107, trends in picture taking activity are determined based on local picture taking activity and/or temporal picture taking activity. At S109, recommendations are provided to camera devices based on detected trends in picture taking activity.

Location Base

Figure 7:
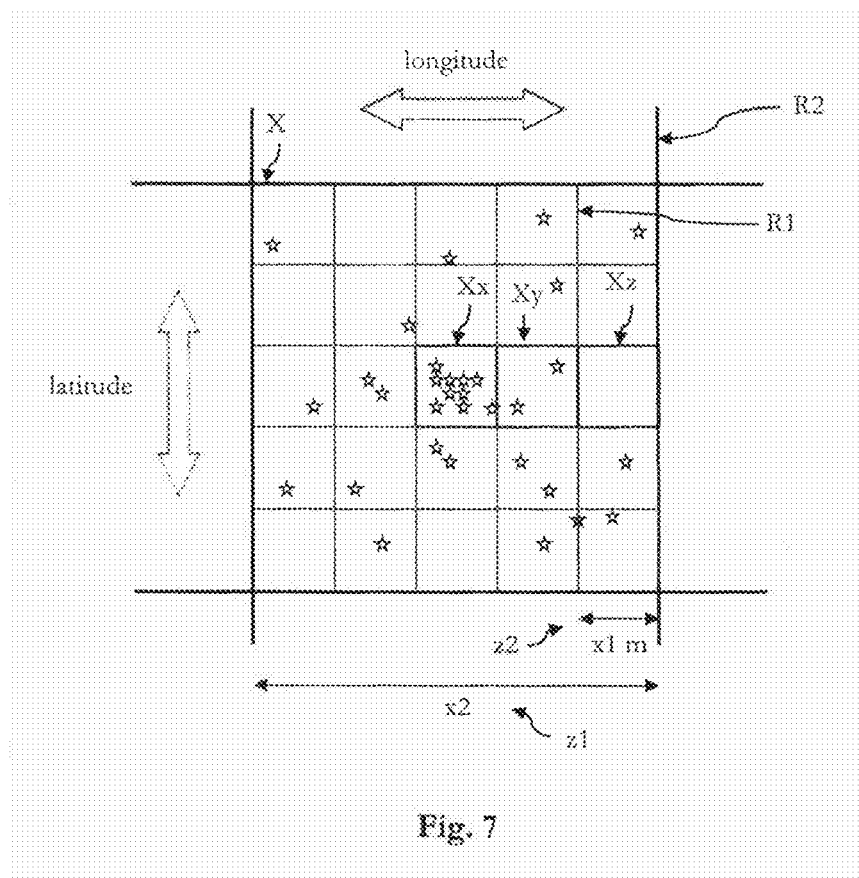
FIG. 7 schematically shows functionality of an exemplary location base analysis unit and of a method for determining local picture taking activity based on meta information stored in a meta information database.

FIG. 7 schematically shows functionality of an exemplary location base analysis unit and of a method for determining local picture taking activity based on meta information stored in a meta information database.

In this embodiment it is performed a real-time collection and processing of geographically-tagged pictures into fixed rasters R1, R2, . . . of a world map. An element of raster R2 has a length x2, whereas a raster element of raster R1 has a length x1, with x1<x2. FIG. 7 shows only two rasters, namely parent raster R2 and child raster R1. Further generations may be used. The location base serves to compare, at different scales, the current activity in a raster element Xx, Xy, Xz with the surrounding raster elements. This enables detecting that the activity in one raster element Xx, Xy, Xz is of particular interest as compared to its neighborhood.

In this embodiment, the geographic location of each incoming picture is mapped onto fixed rasters R1, R2, . . . of the world map at multiple zooming levels z1, z2, . . . . The elements X, Xx, Xy, Xz of the raster may be addressed according to hierarchical latitude/longitude addressing schemes which are known to the skilled person as geohash location encoding algorithms. According to such encoding algorithms each raster element is associated with a unique identifier, called geohash, which is based on a character alphabet. By "Geohash-36" it is commonly referred to a 36 character alphabet as base, such as:

23456789bBCdDFgGhHjJKlLMnNPqQrRtTVWX

A geohash is a code of varying length. Each additional character may represent a further subdivision in a sequential 6×6 raster—starting at the North-West (top-left) coordinate and continuing, row by row, to the South-East (bottom-right). The longer a geohash is, the higher is the zoom level, i.e. the smaller is the addressed raster element. The Statue of Liberty at coordinates 40.689167, −74.044444, using the above character base, may for example be encoded as geohash 9LVB4BH89g. A 10-byte Geohash-36 code is accurate to approximately a 6th of square meter. Alternatively to a 36 character alphabet, with a 25 character alphabet, an additional character could represent a further subdivision in a 5×5 raster. A still further alternative embodiment of a geohash might use sequential, alternating 2×1 and 1×2 subdivisions. In this embodiment, subdivisions are horizontal and vertical in alternating fashion, each subdivision adds one bit to the geohash, the resulting bits are grouped in bytes, and each byte is coded by a character of a predefined character alphabet yielding a 'readable' geohash. Other subdivisions may be applied. In general a subdivision may be described as I×J, where I defined the subdivision in the horizontal direction and J defines the subdivision in the vertical direction. Addition one additional character to a geohash may be considered as increasing the "zoom level" by one I×J magnitude.

The picture taking activity in raster element Xx is determined by counting the number of pictures count_Xx which fall into raster element Xx. In FIG. 7 these picture counts are indicated as little stars. A normalized picture taking activity activity_Xx of raster element Xx at zoom level z2 can be obtained by relating the picture count count_Xx at zoom level z2 to the respective picture count count_X of the raster element X at zoom level z1 which contains raster element Xx, e.g. according to the relation $$\text{activity\_}Xx = (\text{count\_}Xx/\text{count\_}X)/(1/K), \text{ where } K = I \times J$$

As an example, FIG. 7 illustrates that the picture taking count count_Xx in a raster element Xx of a I×J=5×5 (with K=5×5=25) raster at zoom level z2 is randomly expected to be $1/K = 1/25$ of the raster element X at zoom level z1 which contains raster element Xx. It should be noted that the 5×5 raster of this embodiment can be changed to any other dimension I×J containing K=I×J elements. The proportion is than randomly expected to be 1/K.

Using such activity values which represent the proportion of zoom-level z2 versus zoom level z1, the picture taking activity in raster element Xx can be compared with the picture taking activity in neighboring raster elements Xy, Xz, e.g. by testing if $$\text{activity\_}Xx \gg \text{activity\_}Xy, \text{activity\_}Xz.$$

In this embodiment the location base is established by testing the null hypothesis that the picture taking proportion of zoom-level z2 versus zoom level z1 equals 1/K, whereby an increasing zoom level represents dividing an area into K sub-areas by applying another I×J raster. The test of proportions yields a test statistic, the standard score (in short: z-score), which may be named as the location base of a raster element. This standard score may be obtained by statistically computing the number of standard deviations an observed activity in a raster element is above the statistical mean.

This location-base can be calculated for any raster element on any zoom-level at any time, and effectively reports how a certain raster element is more interesting than its surrounding raster elements.

Other methods method for determining local picture taking activity may also be employed. For example cluster algorithms may be applied to identify groups of pictures which reflect a local increase in picture taking activity. For example, a k-means algorithm or a hierarchical cluster algorithm might be used.

Time Base

Next is shown functionality of an exemplary time base analysis unit and of a method for determining temporal picture taking activity based on meta information stored in a meta information database.

In the following embodiments, the time base serves to compare the current activity in a raster element with its historical activity. A time dimension is established to allow detecting an upward movement in picture taking activity. In this embodiment it is performed a real-time collection and processing of geographically and temporally tagged pictures. Each picture is tagged with a corresponding time-stamp which is represented in the form second-in-day::day-in-year::year where second-in-day represents the number of seconds after start of the day (00:00 am), where day-in-year represents the number of days after start of a year (1st January), and where year represents the number of years after start of the time scale (0 A.D.). World wide picture taking activity may be harmonized by transferring time stamps which represent local time to a standardized world time such as Greenwich Mean Time (GMT).

An exemplifying representation combining the local base and the time base would be geohash::second-in-day::day-in-year::year This structure will enable retrieval of all picture taking events on selected days, during a recent time window, on any location at any zoom level. This enables a dynamic calculation of location and time bases. Such a representation allows running a service for picture taking trend detection on a worldwide scale. If, for example, a picture is taken at 9 h13 m, the above structure will allow to retrieve all events taken between 8 h13 and 9 h13 within the current grid element in the last n days with a single database lookup. As such, it will be easy to employ a distributed database warranting horizontal scalability to provide this service on a world scale.

Figure 8A:
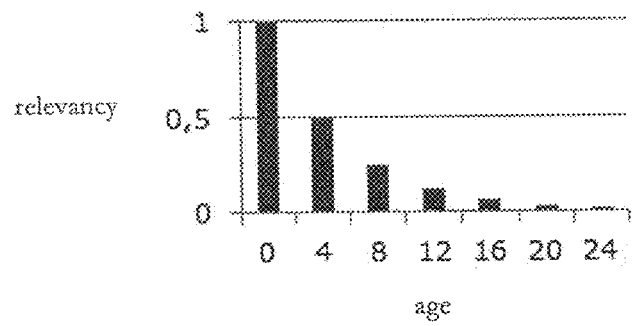
FIGS. 8a, 8b, and 8c show examples of decay functions for defining a picture relevancy.
Figure 8B:
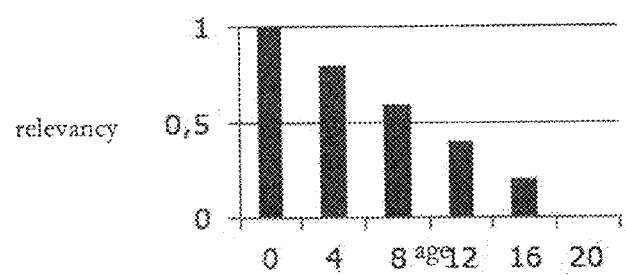
Figure 8C:
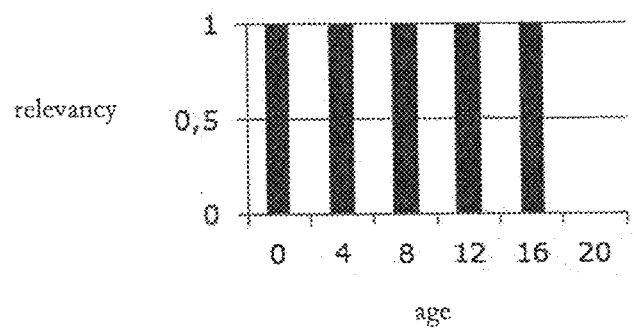

When dynamically building the time base to evaluate the current trending of a specific raster element, a recently taken picture may be regarded to be more important than older pictures. To achieve this, a number of strategies can be applied. Three examples for defining a picture relevancy are given in FIGS. 8a, 8b and 8c, but many more can be conceived. According to the embodiment of FIG. 8a, the service implements, as picture relevancy, a decay function that halves the initial relevance of a picture every n minutes. The relevancy of a currently received picture (age=0) is normalized to one. With increasing age of the image, the relevancy gets smaller and approaches zero. If the decay time is set to n=10 minutes, picture relevancy will have become 1.6% after one hour, if set to n=4 hours then the picture relevancy will have become 1.6% after 24 hours. According to the embodiment of FIG. 8b, a linear decay function is devised, where the relevancy of a picture will be linearly degrading over a time period t. (In FIG. 8, t=20 h). According to the embodiment of FIG. 8c, pictures keep their relevancy for a certain time period t, and then decay to 0 (in the figure below, t=20 h).

When counting images in raster elements as it was described above, the described relevancy factors can be used to establish a time base by multiplying count values with a respective relevancy factor. For example the current picture taking activity at time t can be obtained by counting pictures in raster element Xx using weighted counts:

count_Xx(t)=Sum_Xx (1×relevancy(t−t_c))

Here, t_c represents the time of picture capture, and t represents the current time. The value relevancy (t−t_c) represents the relevancy of an image of age t−t_c, i.e. which was captured a timespan t−t_c earlier than now. 1 is the normalized weighting factor which applies to pictures which are currently taken (t_c=t), so that t−t_c=0. Sum_Xx represents the sum over all pictures in raster element Xx which were taken up to the current time t. A current picture contributes with the value 1×relevancy(t−t_c)=1×relevancy (0)=1×1=1 to the total Sum_Xx.

Trend Detection

Next is shown functionality of an exemplary trend detection unit and of a method for determining trends in picture taking activity based on meta information stored in a meta information database.

In this embodiment trend detection comprises a continuous evaluation of the number of pictures in a raster element and a test whether current picture taking activity is higher than its historical activity and than its surrounding activity.

As already described above the picture taking activity in raster element Xx at time t may be expressed as activity_Xx(t)=(count_x(t)/count_X(t))/(1/25)

where count_x(t)=Sum(Xx(1×relevancy(t−t_c)) and count_X(t)=Sum_X(1×relevancy(t−t_c))

and where Sum_Xx and Sum_X represents the sum over all images in Xx or, respectively, X which were captured up to time t, i.e where t−t_c is greater or equal to 0.

In this embodiment the picture taking trend is detected by calculating the location bases of one raster element over the last n days in a specific time-of-day window. These location bases are then used to create a null distribution of normal picture taking activity in that raster element, against which the current picture taking activity can be tested. If the test yields a positive significant result, the service will have been able to detect a current trend that had been normalized for both its surrounding and historical activity.

Figure 9:
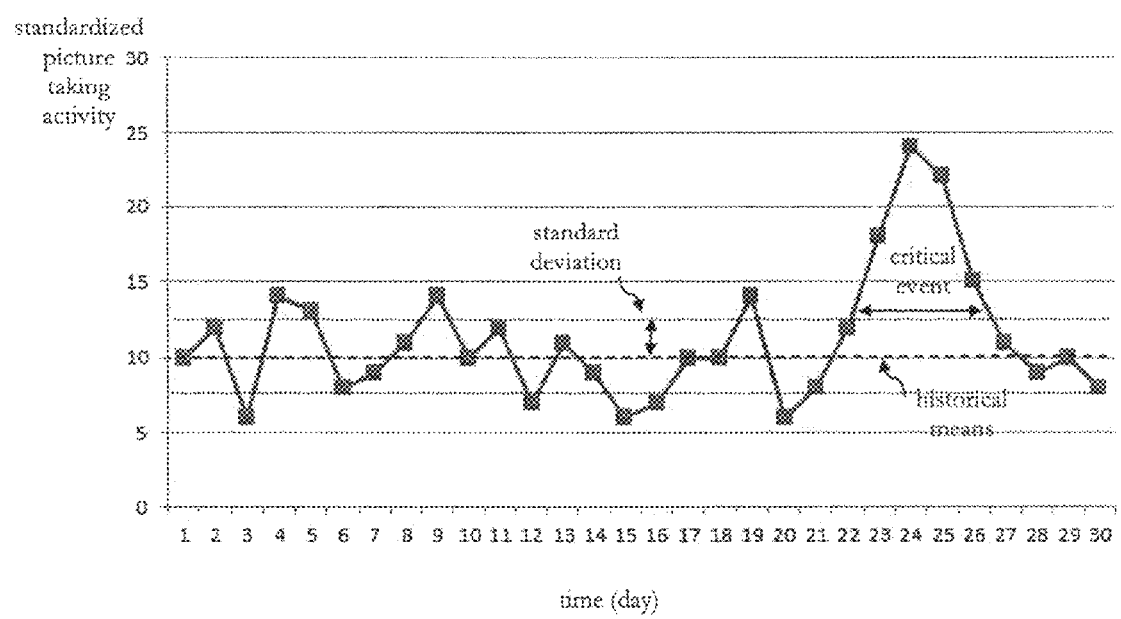
FIG. 9 shows an example of a picture taking activity in an exemplary raster element over time.

FIG. 9 shows an example of a picture taking activity in an exemplary raster element within a specific time window of a day over an arbitrary number of days. Whether a significant trend may be assumed or not may be tested by determining the standard score (z-score) of picture taking activity in a raster element. For example, for the specific time window in each day, the standard score (z-score) of a raster element is calculated to establish the time base over a certain time interval. In the diagram of FIG. 9 the picture taking activity is plotted over a time span of 30 days, starting with day 1 end ending with day 30. The dashed line indicates the means of the historical picture taking activity. This historical mean may for example be calculated as a moving average. The dotted line indicates the standard deviation of the historical picture taking activity. From day 20 to day 25 the picture taking activity remains within its standard deviation.

At day 26 the image taking activity increases over the expected standard deviation. At day 28 the picture taking activity reaches its maximum. At day 29 the picture taking activity decreases again. At day 30 the picture taking activity is again within the expected standard deviation. In this embodiment a significant trend is assumed at times where the difference between the picture taking activity and its historical means is above the expected standard deviation. In alternative embodiments, a significant trend may also be defined to require more deviation from the historical means, e.g. two standard deviations. The confidence that a critical event is validly confirmed by the trend analysis increases when requiring larger deviations from the historical means.

An alternative embodiment takes into account that picture taking activity may be highly dependent on the time of day (e.g. daylight, market, lunchtime, etc). In such an alternative embodiment the historical time base is preferably a dynamic representation built from preceding days at the same time-of-day as the current activity evaluation.

Still other embodiments for trend detection within a raster element are conceivable for the skilled person. For example, in an alternative embodiment, two moving averages with two different time scales may be compared to each other, one moving average having a long time scale and the other moving average having a short time scale. Start of a critical trend may be assumed if the moving average with short time scale crosses the moving average with long time scale.

In the above-described embodiments each incoming picture event will trigger calculation of the baseline for the raster in which the picture was taken and will therefore establish whether picture taking frequency significantly deviates from the normally expected baseline in this raster element.

Any detected significant picture taking trend may be recorded in a cache to allow easy lookup of current trends based on a particular location.

Notification

Figure 10:
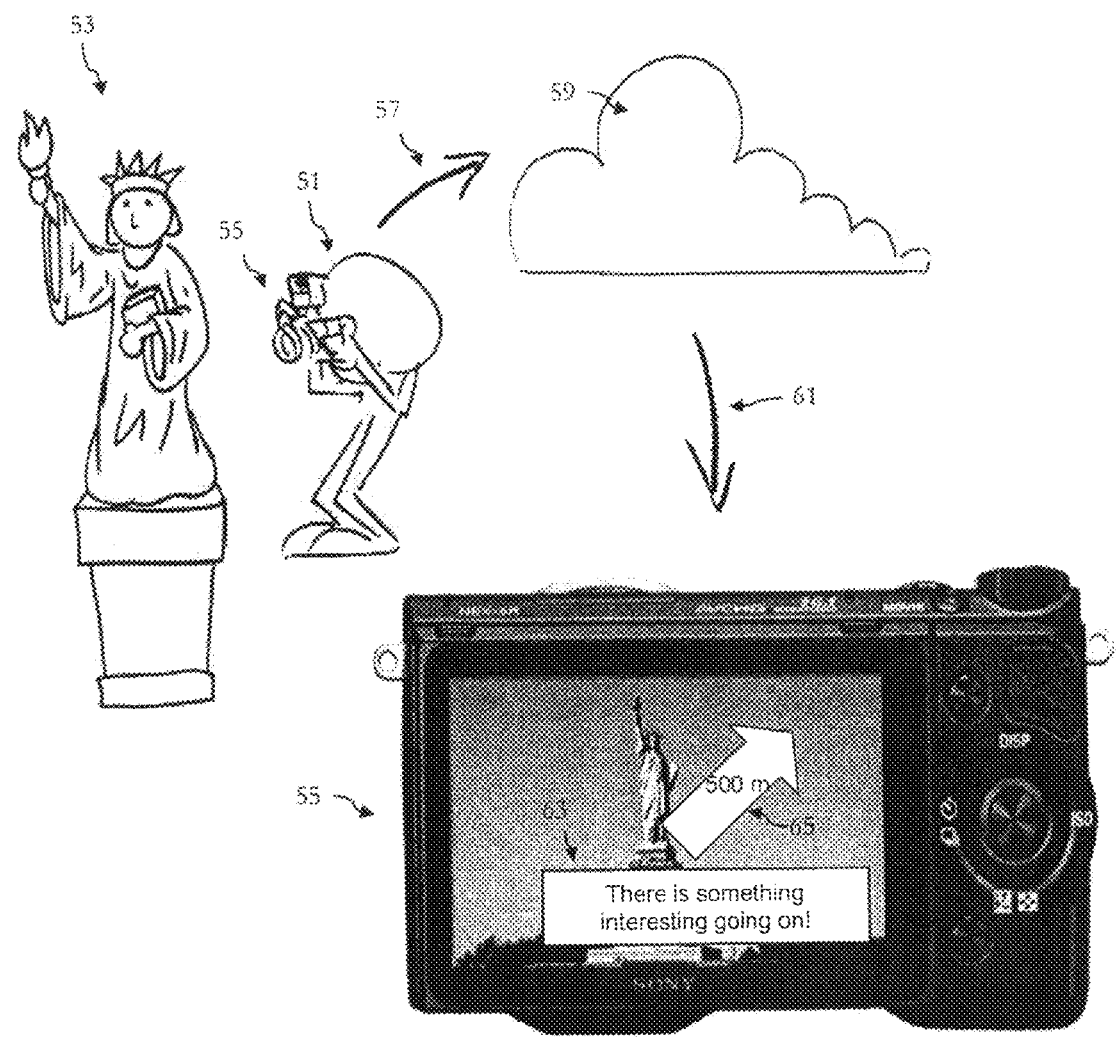
FIG. 10 shows an exemplary notification of a detected trend.

FIG. 10 shows an exemplary notification of a detected trend to the user of a camera device. User 51 is currently trying to take pictures of the Statue of Liberty 53 with camera device 55. As indicated by arrow 57 the current GPS coordinates and physical orientation of camera device 55 are transmitted to a cloud service 59. The cloud service 59 comprises an apparatus for detecting trends in picture taking activity as described in this specification. The cloud service evaluates the geographic position and physical orientation of camera device 55 and provides recommendations to the user 51 of camera device 55 about trends in picture taking activity in the vicinity of user 51. Arrow 61 indicates the transmission of a recommendation from the cloud service 59 to camera device 55. A textual notification 63 stating "There is something interesting going on!" is displayed to user 51 on the LCD display of camera device 55. An auxiliary notification in form of arrow 65 is also displayed to user 51 in order to indicate the direction and distance, here 500 m, where the interesting event is going on. Upon reception of this notification user 51 can decide whether he wants to stop photographing the Statue of Liberty 53 in order to join the interesting event notified to him.

Figure 11:
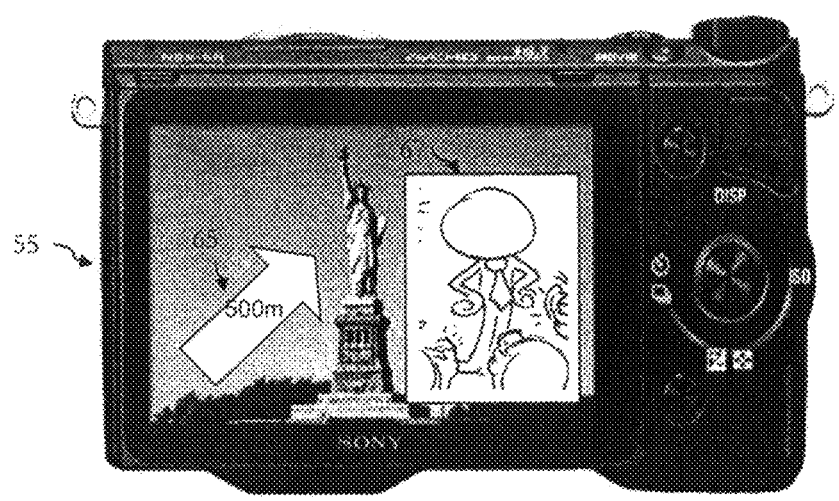
FIG. 11 shows a further exemplary notification of a detected trend.

FIG. 11 shows a further exemplary notification of a detected trend to the user of a camera device. In this embodiment the notification on the camera's LCD display comprises, in addition to arrow 65 which indicates the direction and distance where the interesting event is going on, a picture 67 which was taken by a person with a camera device at the interesting event and which was recently uploaded to the cloud service. This picture 67 gives user 51 an impression of what is going on and thus helps him in deciding whether he wants to join the interesting event, or not.

Cloud-Based Photo Guide

The above described apparatus, systems and methods for determining trends in picture taking activity may also be used within the framework auf a cloud-based photo-guide.

A cloud-based photo-guide service may for example be provided for a camera device (e. g. smart phone) that communicates with the cloud (which stores massive amounts of data about users) in a bi-directional way. The camera device provides location data to the cloud, optionally data about a physical orientation of the camera, or other parameters which influence the field of view like focal length (zoom level) etc. The camera device may also upload the pictures taken, as it was described above in the context of the apparatus, systems and methods for determining trends in picture taking activity.

A camera device may receive from the cloud-based photo-guide information and/or recommendations about objects or details frequently photographed, based on information derived from uploads by many different users which have taken photos in the past. For example, recommendations can be conveyed to the user by enhancing the image shown on the camera display (which conventionally depicts only the field of vision of the camera).

The above described location base analysis may be applied by the cloud-based photo guide service to determine such objects or locations of interest.

The recommendations may refer to objects to be photographed from the current location and orientation of the camera, as well as to similar objects nearby.

Figure 12:
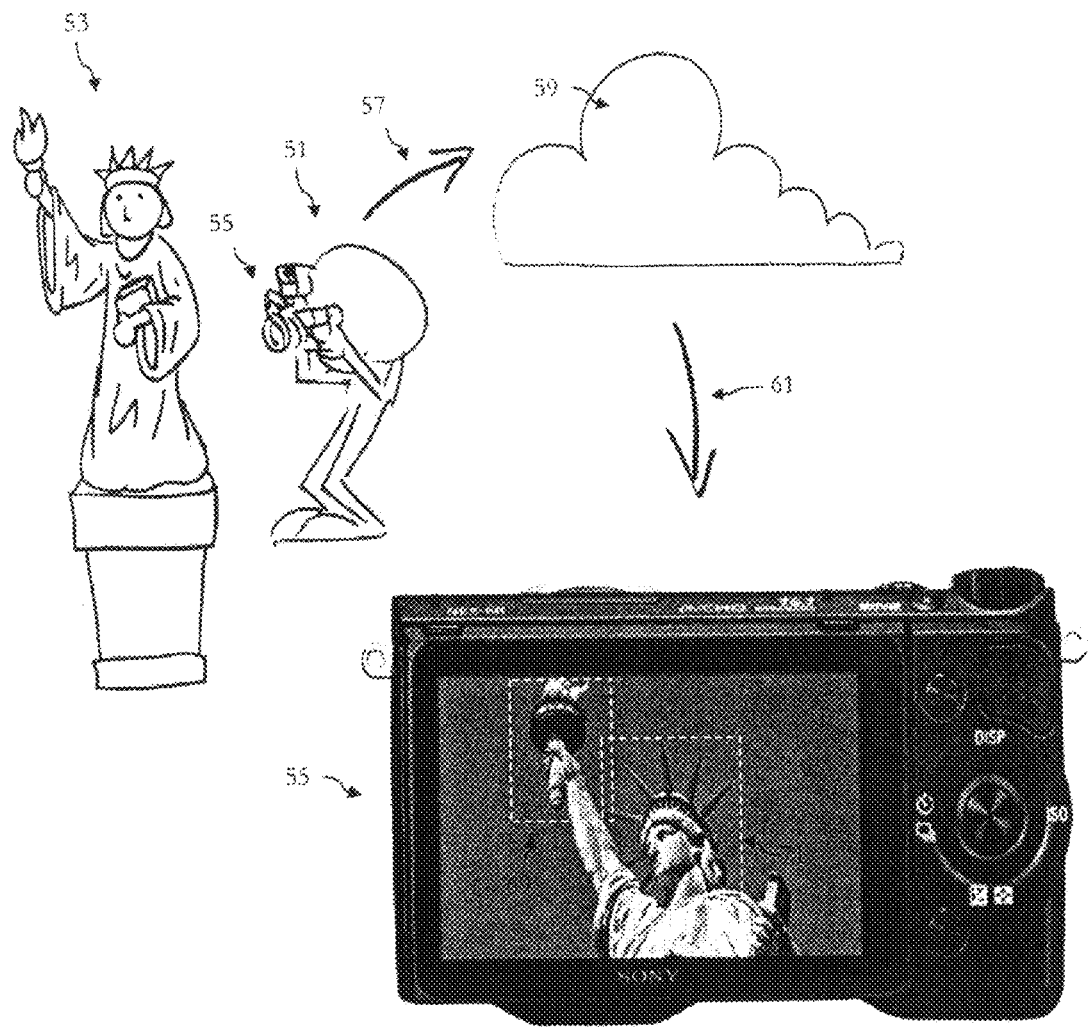
FIG. 12 shows an example of a recommendation which refers to objects to be photographed from the current location and orientation of the camera device.

FIG. 12 shows an example of a recommendation which refers to objects to be photographed from the current location and orientation of the camera. FIG. 12 shows an exemplary notification of an interesting object to the user of a camera device. User 51 is currently trying to take pictures of the Statue of Liberty 53 with camera device 55. As indicated by arrow 57 the current GPS coordinates and the physical orientation of the camera device 55 are transmitted to cloud service 59. The cloud service 59 comprises a cloud-based photo-guide service. The cloud service evaluates the geographic position and physical orientation of camera device 55 and provides recommendations to the user 51 of camera device 55 about interesting objects at which he may point his camera device. Arrow 61 indicates the transmission of a recommendation from the cloud service 59 to camera device 55. Two recommendation are displayed to user 51 on the LCD display of camera device 55 in form of rectangles 69 and 71 which indicate the recommended objects. Upon receipt of these recommendations user 51 may decide that he wants to take own pictures of the recommended objects.

Figure 13:
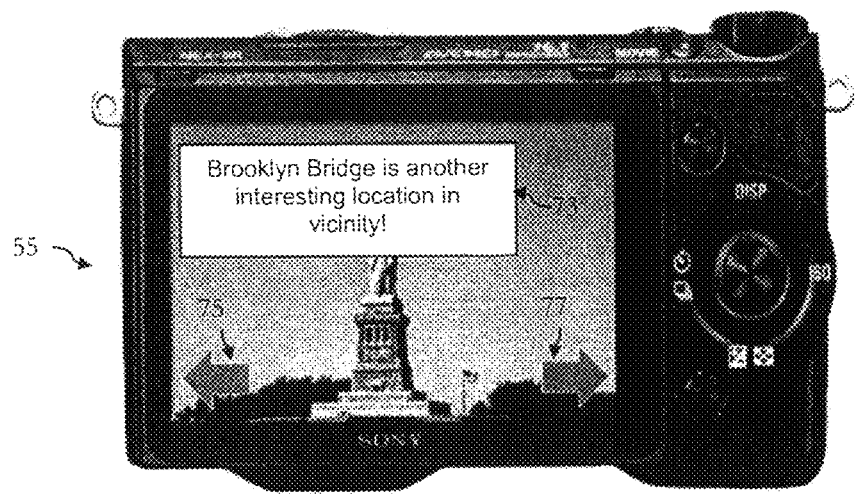
FIG. 13 shows an example of a recommendation which refers to objects to be photographed nearby the current location of camera device.

FIG. 13 shows an example of a recommendation which refers to objects to be photographed nearby the current location of camera device 55. Notification 73 recommends Brooklyn Bridge to the user of the camera device 55. Touch arrows 75 and 77 may be used by the user to skip through a list of recommendations.

Figure 14:
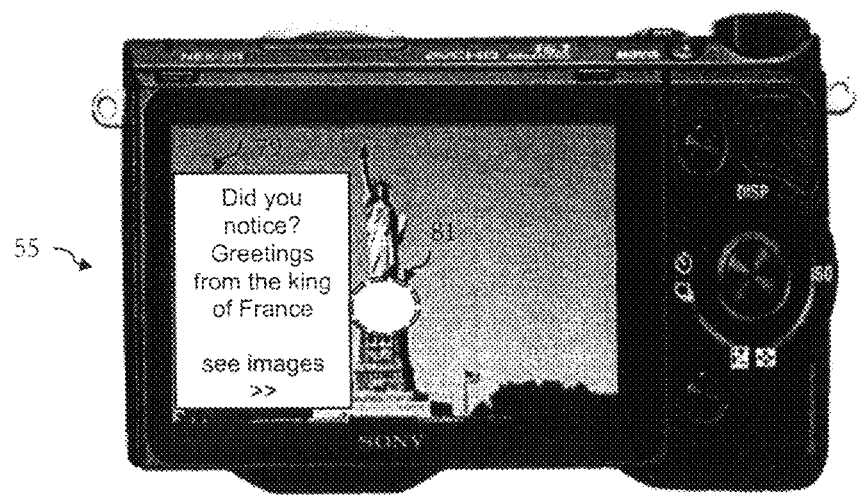
FIG. 14 shows a textual notification which refers to historical background.

Also, information about historical backgrounds, interesting facts etc. can be provided by the cloud-based photo-guide service. FIG. 14 shows a textual notification 79 which refers to historical background in the context of the Statue of Liberty. The notification 79 states "Did you notice? Greetings from the king of France". Notification 79 further comprises an link "see images >>" which the user may touch to receive further information about the historical background indicated. A circle 81 indicates the specific location to which notification 79 refers.

All units and entities described in this specification and claimed in the appended claims can, if not stated otherwise, be implemented as integrated circuit logic, for example on a chip, and functionality provided by such units and entities can, if not stated otherwise, be implemented by software.

It is thus disclosed in this specification:

(1) An apparatus for determining trends in picture taking activity comprising
 a meta information accessing unit configured to access a set of meta information, each meta information in the set of meta information being associated with a picture and comprising location information and/or temporal information, the location information describing the geographic location at which an associated picture was taken and the temporal information describing the time at which an associated picture was taken; and
 a processing device configured to determine trends in picture taking activity based on the set of meta information accessible by the meta information accessing unit.

(2) The apparatus of (1), further comprising
 a picture storage configured to store a set of pictures, each picture having been taken with a camera device at a respective geographic location by one of a plurality of camera users; and
 a meta information database configured to store a set of meta information, each meta information being associated with a picture of the set of pictures.

(3) The apparatus of (2), in which the processing device further comprises
 a location base analysis unit configured to determine local picture taking activity based on the meta information stored in the meta information database; and
 a time base analysis unit configured to determine temporal picture taking activity based on the set of meta information stored in the meta information database.

(4) The apparatus of (3), in which the processing device further comprises an trend detection unit configured to determine trends in picture taking activity based on local picture taking activity obtained by the location base analysis unit and/or based on temporal picture taking activity obtained by the time base analysis unit.

(5) The apparatus of (4), in which the trend detection unit is configured to determine trends in picture taking activity based on pictures uploaded to the apparatus for determining trends in picture taking from a plurality of camera devices in real-time, and in which a determined trend corresponds to a current event taking place at a specific location which causes the number of uploaded pictures to be higher than a historical mean.

(6) The apparatus of (1) to (5), in which the processing device comprises
 a camera parameter reception unit configured to receive camera parameters of a camera device; and
 a recommendation providing unit configured to provide recommendations to the camera device based on the received camera parameters and based on detected trends in picture taking activity.

(7) A cloud service comprising the apparatus for determining trends in picture taking activity of anyone of the (1) to (6), the cloud service configured to provide recommendations to users of camera devices based on determined trends in picture taking activity.

(8) A camera device, the camera device comprising
 a recommendation reception unit configured to receive recommendations from an apparatus for determining trends in picture taking activity, the recommendations being based on trends in picture taking activity detected by the apparatus for determining trends in picture taking activity; and
 a recommendation notification unit configured to notify recommendations received from the apparatus for determining trends in picture taking activity.

(9) The camera device of (8) in which the recommendations received by the recommendation reception unit are determined based on pictures and associated meta information uploaded to the apparatus for determining trends in picture taking activity by other camera devices in the vicinity of the camera device.

(10) The camera device of (8) or (9), further comprising
 a picture taking unit configured to take pictures sensed by a picture sensor;
 a meta information determination unit configured to determine meta information, each meta information being associated with a picture having been taken with the picture taking unit at a respective geographic location and at a respective time;
 a data communication interface configured to connect the camera device to a telecommunication network; and
 an uploading unit configured to upload pictures taken with the picture sensor, associated meta information determined by the meta information determination unit, and camera parameters to the apparatus for determining trends in picture taking activity.

(11) The camera device of (10) in which the uploading unit is configured to upload pictures to the apparatus for determining trends in picture taking activity in real-time.

(12) The camera device of anyone of (8) to (11) in which the recommendation notification unit is configured to display to a user of the camera device a textual notification relating to an interesting event, a notification in form of an arrow which indicates a direction where an interesting event is going on, or an indication of a distance of an interesting event.

(13) A system comprising
 an apparatus configured to determine trends in picture taking activity as defined in anyone of (1) to (12); and
 one or more camera devices, each camera device having
  a picture sensor configured to sense pictures;
  a picture taking unit configured to take pictures sensed by the picture sensor;
  a meta information determination unit configured to determine meta information, each meta information being associated with a picture having been taken with the picture sensor at a respective geographic location and at a respective time;
  a data communication interface configured to connect the camera device to a telecommunication network;
  an uploading unit configured to upload pictures taken with the picture sensor, associated meta information determined by the meta information determination unit, and camera parameters to the apparatus for determining trends in picture taking activity;
  a recommendation reception unit configured to receive recommendations from the apparatus for determining trends in picture taking activity; and
  a recommendation notification unit configured to notify recommendations received from the apparatus for determining trends in picture taking activity.

(14) A method of determining trends in picture taking activity comprising
accessing a set of meta information, each meta information in the set of meta information being associated with a picture having been taken with a camera device at a respective geographic location and at a respective time; and
determining trends in picture taking activity based on the set of meta information accessible by the meta information accessing unit.
(15) The method of (14), further comprising
storing in a picture storage a set of pictures, each picture having been taken with a camera device at a respective geographic location; and
storing in a meta information database a set of meta information, each meta information being associated with a picture of the set of pictures, the meta information comprising location information and time information, the location information describing the geographic location at which an associated picture was taken and the temporal information describing the time at which an associated picture was taken.
(16) The method of anyone of (14) to (15), wherein the determining trends in picture taking activity comprises
determining local picture taking activity based on the meta information stored in the meta information database; and
determining temporal picture taking activity based on the set of meta information stored in the meta information database.
(17) The method of (16), wherein the determining trends in picture taking activity comprises
determining trends in picture taking activity based on local picture taking activity and/or temporal picture taking activity; and wherein the method further comprises
providing recommendations to camera devices based on detected trends in picture taking ac(18)
(18) The method of (16), wherein determining local picture taking activity comprises performing a real-time collection and processing of geographically-tagged pictures into fixed rasters of a world map.
(19) The method of (16), wherein determining temporal picture taking activity comprises regarding a recently taken picture to be more important than older pictures.
(20) An apparatus for determining recommendations to a user of a camera device, comprising
a camera parameter reception unit configured to receive camera parameters from the camera device; and
a processing unit configured to determine recommendations based on camera parameters and based on information derived from uploads by many different users which have taken photos in the past.
(21) A cloud service comprising the apparatus determining recommendations to a user of a camera device of (20), the cloud service being configured to provide recommendations to users of camera devices based on camera parameters and based on information derived from uploads by many different users which have taken photos in the past.

The invention claimed is:
1. An apparatus for determining trends in picture taking activity comprising:
circuitry configured to:
access a set of meta information, each meta information in the set of meta information being associated with a picture and comprising location information and temporal information, the location information describing the geographic location at which an associated picture was taken and the temporal information describing the time at which an associated picture was taken;
derive historical picture taking activity at a specific location from the set of meta information including a historical mean of a number of pictures uploaded at the specific location over a past predetermined number of days, the historical mean including a first moving average having first time scale and a second moving average having a second time scale that is shorter than the first time scale;
determine trends in picture taking activity based on the at least historical picture taking activity; and
determine a current picture taking event that is taking place at the specific location, which causes the second moving average to cross the first moving average, as a trend in picture taking activity.

2. The apparatus of claim 1, wherein the circuitry is further configured to:
store a set of pictures, each picture having been taken with a camera device at a respective geographic location by one of a plurality of camera users; and
store a set of meta information, each meta information being associated with a picture of the set of pictures.

3. The apparatus of claim 2, wherein the circuitry is further configured to:
determine local picture taking activity based on the stored meta information; and
determine temporal picture taking activity based on the stored set of meta information.

4. The apparatus of claim 3, wherein the circuitry is further configured to determine trends in picture taking activity based on the local picture taking activity and/or based on the temporal picture taking activity.

5. The apparatus of claim 4, wherein the circuitry is further configured to:
determine trends in picture taking activity based on pictures uploaded to the apparatus from a plurality of camera devices in real-time.

6. The apparatus of claim 1, wherein the circuitry is further configured to:
receive camera parameters of a camera device; and
provide recommendations to the camera device based on the received camera parameters and based on determined trends in picture taking activity.

7. A cloud service comprising the apparatus for determining trends in picture taking activity of claim 1, the cloud service configured to provide recommendations to users of camera devices based on determined trends in picture taking activity.

8. A system comprising:
the apparatus configured to determine trends in picture taking activity as defined in claim 1; and
one or more camera devices, each camera device having circuitry configured to:
take pictures sensed by a picture sensor;
determine meta information, each meta information being associated with a picture having been taken at a respective geographic location and at a respective time;
connect the camera device to a telecommunication network;
upload pictures taken, associated determined meta information, and camera parameters to the apparatus;
receive recommendations from the apparatus; and
notify recommendations received from the apparatus.

9. A camera device, the camera device comprising:
circuitry configured to:
receive recommendations from an apparatus for determining trends in picture taking activity, the recommendations being based on the trends in picture taking activity determined by the apparatus based on a historical mean of a number of pictures uploaded at a specific location over a past predetermined number of days including a first moving average having first time scale and a second moving average having a second time scale that is shorter than the first time scale and a current picture taking event that is taking place at the specific location, wherein the current picture taking event that is taking place at the specific location, which causes the second moving average to cross the first moving average, is determined as a trend in picture taking activity; and
notify recommendations received from the apparatus.

10. The camera device of claim 9, wherein the received recommendations are determined based on pictures and associated meta information uploaded to the apparatus by other camera devices in the vicinity of the camera device.

11. The camera device of claim 9, wherein the circuitry is further configured to:
take pictures sensed by a picture sensor;
determine meta information, each meta information being associated with a picture having been taken at a respective geographic location and at a respective time;
connect the camera device to a telecommunication network; and
upload pictures taken, associated determined meta information, and camera parameters to the apparatus.

12. The camera device of claim 11, wherein the circuitry is further configured to upload pictures to the apparatus in real-time.

13. The camera device of claim 9, wherein the circuitry is further configured to display a textual notification relating to an interesting event, a notification in form of an arrow which indicates a direction where an interesting event is going on, or an indication of a distance of an interesting event to a user of the camera device.

14. A method of determining trends in picture taking activity comprising:
accessing a set of meta information, each meta information in the set of meta information being associated with a picture having been taken with a camera device at a respective geographic location and at a respective time;
deriving historical picture taking activity at a specific location from the set of meta information including a historical mean of a number of pictures uploaded at the specific location over a past predetermined number of days, the historical mean including a first moving average having first time scale and a second moving average having a second time scale that is shorter than the first time scale;
determining trends in picture taking activity based on the at least historical picture taking activity; and
determining a current picture taking event that is taking place at the specific location, which causes the second moving average to cross the first moving average, as a trend in picture taking activity.

15. The method of claim 14, further comprising:
storing a set of pictures, each picture having been taken with a camera device at a respective geographic location; and
storing a set of meta information, each meta information being associated with a picture of the set of pictures, the meta information comprising location information and time information, the location information describing the geographic location at which an associated picture was taken and the temporal information describing the time at which an associated picture was taken.

16. The method of claim 15, wherein the determining trends in picture taking activity comprises:
determining local picture taking activity based on the stored meta information; and
determining temporal picture taking activity based on the stored set of meta information.

17. The method of claim 16, wherein
the determining trends in picture taking activity comprises determining trends in picture taking activity based on the local picture taking activity and/or the temporal picture taking activity; and
the method further comprises providing recommendations to camera devices based on determined trends in picture taking activity.

18. The method of claim 16, wherein the determining local picture taking activity comprises performing a real-time collection and processing of geographically-tagged pictures into fixed rasters of a world map.

19. The method of claim 16, wherein the determining temporal picture taking activity comprises regarding a recently taken picture to be more important than older pictures.

20. An apparatus for determining recommendations to a user of a camera device, comprising:
circuitry configured to:
receive camera parameters of the camera device from the camera device; and
determine recommendations based on camera parameters and based on information derived from uploads by many different users which have taken photos in the past, the information including a historical mean of a number of pictures uploaded at a specific location over a past predetermined number of days including a first moving average having first time scale and a second moving average having a second time scale that is shorter than the first time scale and a current picture taking event that is taking place at the specific location, wherein the current picture taking event that is taking place at the specific location, which causes the second moving average to cross the first moving average, is determined as a trend in picture taking activity.

21. A cloud service comprising the apparatus for determining recommendations to a user of a camera device of claim 20, the cloud service being configured to provide recommendations to users of camera devices based on camera parameters and based on information derived from uploads by many different users which have taken photos in the past.

22. An apparatus for determining trends in picture taking activity comprising:
circuitry configured to:
access a set of meta information, each meta information in the set of meta information being associated with a picture and comprising location information and temporal information, the location information describing the geographic location at which an associated picture was taken and the temporal information describing the time at which an associated picture was taken;
derive historical picture taking activity at a specific location from the set of meta information including a historical mean of a number of pictures uploaded at the specific location over a past predetermined number of days;

determine trends in picture taking activity based on the at least historical picture taking activity;

determine a current picture taking event that is taking place at the specific location, which causes the number of pictures uploaded to be above a standard deviation of the historical mean, as a trend in picture taking activity; and determine the current picture taking event that is taking place at the specific location, which causes the number of pictures uploaded to be within the standard deviation of the historical mean and higher than the historical mean, as not the trend in picture taking activity.

23. A camera device, the camera device comprising:

circuitry configured to:

receive recommendations from an apparatus for determining trends in picture taking activity, the recommendations being based on the trends in picture taking activity determined by the apparatus based on a historical mean of a number of pictures uploaded at a specific location over a past predetermined number of days and a current picture taking event that is taking place at the specific location, wherein the current picture taking event that is taking place at the specific location, which causes the number of pictures uploaded to be above a standard deviation of the historical mean, is determined as a trend in picture taking activity, and the current picture taking event that is taking place at the specific location, which causes the number of pictures uploaded to be within the standard deviation of the historical mean and higher than the historical mean, is determined as not the trend in picture taking activity; and notify recommendations received from the apparatus.

24. A method of determining trends in picture taking activity comprising:

accessing a set of meta information, each meta information in the set of meta information being associated with a picture having been taken with a camera device at a respective geographic location and at a respective time;

deriving historical picture taking activity at a specific location from the set of meta information including a historical mean of a number of pictures uploaded at the specific location over a past predetermined number of days;

determining trends in picture taking activity based on the at least historical picture taking activity;

determining a current picture taking event that is taking place at the specific location, which causes the number of pictures uploaded to be above a standard deviation of the historical mean, as a trend in picture taking activity; and determining the current picture taking event that is taking place at the specific location, which causes the number of pictures uploaded to be within the standard deviation of the historical mean and higher than the historical mean, as not the trend in picture taking activity.

25. An apparatus for determining recommendations to a user of a camera device, comprising:

circuitry configured to:

receive camera parameters of the camera device from the camera device; and determine recommendations based on camera parameters and based on information derived from uploads by many different users which have taken photos in the past, the information including a historical mean of a number of pictures uploaded at a specific location over a past predetermined number of days and a current picture taking event that is taking place at the specific location, wherein the current picture taking event that is taking place at the specific location, which causes the number of pictures uploaded to be above a standard deviation of the historical mean, is determined as a trend in picture taking activity, and the current picture taking event that is taking place at the specific location, which causes the number of pictures uploaded to be within the standard deviation of the historical mean and higher than the historical mean, is determined as not the trend in picture taking activity.

* * * * *